(12) United States Patent
Lewis (10) Patent No.: US 7,181,875 B2
(45) Date of Patent: Feb. 27, 2007

(54) STOCK MATERIAL FOR TRIM CAPS

(75) Inventor: Rodney R. Lewis, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 637 days.

(21) Appl. No.: 10/112,995

(22) Filed: Mar. 29, 2002

(65) Prior Publication Data

US 2003/0182833 A1   Oct. 2, 2003

(51) Int. Cl.
*G09F 13/28* (2006.01)
(52) U.S. Cl. .......................................... 40/551; 40/574
(58) Field of Classification Search ................ 40/578, 40/552, 551, 564; 52/800.12, 287.1, 288, 52/716.1–717.06; 428/354
See application file for complete search history.

(56) References Cited

U.S. PATENT DOCUMENTS

| | | | |
|---|---|---|---|
| RE24,906 E | | 12/1960 | Ulrich |
| 3,160,549 A | * | 12/1964 | Caldwell et al. .......... 428/317.3 |
| 3,494,075 A | * | 2/1970 | Kunevicus .................... 49/462 |
| 3,675,355 A | * | 7/1972 | Shanok et al. ................ 40/596 |
| 3,760,552 A | * | 9/1973 | Skoetsch ...................... 52/578 |
| 3,937,384 A | | 2/1976 | Minogue et al. |
| 3,974,552 A | | 8/1976 | Minogue et al. |
| 4,097,632 A | | 6/1978 | Minogue et al. |
| 4,277,526 A | * | 7/1981 | Jackson ........................ 428/31 |
| 4,310,509 A | | 1/1982 | Berglund et al. |
| 4,323,557 A | | 4/1982 | Rosso et al. |
| 4,701,991 A | | 10/1987 | Scheffer, Sr. |
| 4,749,590 A | | 6/1988 | Klingen et al. |
| 4,855,170 A | * | 8/1989 | Darvell et al. ............. 428/40.2 |
| 4,895,745 A | | 1/1990 | Vesley et al. |
| 4,950,537 A | | 8/1990 | Vesley et al. |
| 5,062,665 A | * | 11/1991 | Schotthoefer ............... 280/770 |
| 5,804,610 A | | 9/1998 | Hamer et al. |
| 5,881,591 A | | 3/1999 | Ondracek |
| 5,932,298 A | | 8/1999 | Moon |
| 5,962,099 A | | 10/1999 | Bloch et al. |
| 6,103,152 A | | 8/2000 | Gehlsen et al. |
| 6,197,397 B1 | | 3/2001 | Sher et al. |
| 2001/0014392 A1 | | 8/2001 | Bloch et al. |
| 2001/0042330 A1 | | 11/2001 | Grate et al. |
| 2002/0028326 A1 | * | 3/2002 | Lhila et al. .............. 428/317.1 |

FOREIGN PATENT DOCUMENTS

| WO | WO 01/21336 | 3/2000 |
|---|---|---|
| WO | WO 01/57152 | 9/2001 |

OTHER PUBLICATIONS

3M VBH™ Acrylic Foam Tape 5952. Technical Data, Mar. 2001, 2 pages.

\* cited by examiner

*Primary Examiner*—Cassandra Davis
(74) *Attorney, Agent, or Firm*—James D. Christoff (57) ABSTRACT

A trim cap for a sign cabinet such as a channel letter includes an elongated formable band along with a pressure activated adhesive layer that is connected to the band. The adhesive layer is conformable to facilitate adherence of the trim cap to the edge of a sign face of the light cabinet. Preferably, the adhesive layer comprises a pressure activated adhesive and a foam layer that includes a plurality of polymeric microspheres.

22 Claims, 2 Drawing Sheets

STOCK MATERIAL FOR TRIM CAPS

BACKGROUND OF THE INVENTION

1. Field of the Invention

This invention relates to a component for illuminated sign cabinets. More specifically, the present invention relates to trim caps that are especially useful for channel letters.

2. Description of the Related Art

Backlit signs play an important role in modern commerce. A typical backlit sign is made up of a light box, often called a sign cabinet, which is covered by a light transmitting cover. The sign cabinet is typically a sheet metal enclosure containing light sources such as fluorescent tubes, incandescent lamps, or other illuminating devices. Light may also be brought to the sign cabinet from an external source by, for example, optical fibers or light pipes. The interior surface of the sign cabinet is often diffusely reflective, so as to improve light utilization and uniformity of illumination.

While many backlit signs are of simple rectangular or other geometric shapes, a particularly effective type of backlit sign is one which is made in the shape of an alphabetical letter, a number, a logo or other image, so that the entire sign becomes the image. A series of such signs can then be used, for example, to spell words or to collectively portray a larger image. Backlit signs of this sort are called channel letters, even though they often represent images other than letters.

Channel letters can be made by first fabricating a sign cabinet in the shape of the desired letter or other image. A light transmitting front cover is then fabricated from a sheet of light transmitting material such as polymethyl methacrylate or polycarbonate by cutting the sheet into the shape of the desired letter or other image. A flange-like border or retainer, commonly called a trim cap, is then attached to the peripheral edge of the cut out sheet. The trim cap serves to connect the cut out sheet to the sign cabinet and also to help block the entry of rain and other moisture into the inner chamber of the sign cabinet.

Trim caps are often fabricated from a length of trim cap stock material which can be purchased in bulk rolls. The trim cap material is formed around the cut out sign face by bending it at appropriate locations and mechanically or adhesively fastening it to the edge of the face. The completed cover is then fitted onto the front of the sign cabinet, with the edge of the trim cap engaging the front edge of the cabinet, thereby locating the cover in alignment with the cabinet. The cover can then be fastened to the cabinet by, for example, self tapping screws running through areas of overlap between the trim cap and the cabinet.

In the past, it has been common practice to attach trim caps to sign faces by use of solvent based adhesives. As an example, the sign face was placed over a sheet of plywood such that the exterior side of the sign face is facing the plywood. Next, the trim cap was placed along the edge of the sign face and held in place by a fixture such as a closely-spaced series of nails hammered into the plywood. A solvent based adhesive was then applied to the joint between the trim cap and the sign face edge along the perimeter of the latter. After the adhesive has dried, a second adhesive was commonly applied to increase the strength of the joint. After the second adhesive had dried, the nails were removed from the plywood for enabling the cover to be connected to the sign cabinet when desired.

As can be appreciated, the use of nails or other type of fixturing in the practice described above is somewhat time consuming and occupies space in the workshop during the time that the adhesive is allowed to dry. Moreover, the use of certain solvent-based adhesives can increase the risk health problems in individuals associated with its handling and use. The solvent of certain adhesives can also damage some types of plastic materials, rendering them unusable for the tasks at hand.

SUMMARY OF THE INVENTION

The present invention provides a trim cap stock material having a pressure activated adhesive layer for attaching trim cap material to the edge of a sign face. As used herein, the term "pressure activated adhesive" will mean an adhesive wherein adhesion to a surface is initiated by pressing the adhesive into intimate contact with the surface. One well-known type of pressure activated adhesive is a tacky pressure sensitive adhesive.

In the present invention, the pressure activated adhesive layer of the trim cap stock material is conformable to surface irregularities on the edges of the sign faces and is also resistant to tensile stresses. This combination of properties enables the adhesive to withstand tensile loading of the adhesive layer while still allowing intimate surface contact between the adhesive layer and the edge of the sign face. It has been found, in the present invention, that tensile loading of the adhesive, caused by a tendency of the trim cap to pull away from the edge of the sign face due to imperfect forming of the trim cap during the bending process, can add significantly to the risk of adhesive failure in the attachment of the trim cap to the edge of the sign face.

Preferably, the pressure activated adhesives of the trim cap stock material avoid the use of free solvents, as might be used with solvent welding or solvent based adhesives. As a result, the adhesives of the present invention can be used with solvent-sensitive materials without the risk of solvent damage. An example of a particularly useful solvent-sensitive material is a clear plastic sheet (such as polycarbonate or polymethylmethacrylate) covered by a colored translucent polyvinyl chloride film laminated thereto with a pressure activated adhesive.

In one aspect, the present invention is directed to a stock material for forming trim caps. The stock material comprises an elongated formable band having a major surface. A pressure activated adhesive layer is connected to the major surface of the band. The layer extends along the longitudinal axis of the band. The adhesive layer is conformable in directions toward the major surface.

In another aspect, the present invention is directed toward a channel letter having a sign face with a peripheral edge and a trim cap connected to the peripheral edge. The trim cap includes a conformable pressure activated adhesive layer in contact with the peripheral edge. The adhesive layer comprises a pressure activated adhesive and a foam layer. The foam layer comprises polymeric microspheres.

Further aspects of the invention are set out in the detailed description that follows and are illustrated in the accompanying drawings.

DETAILED DESCRIPTION OF THE PREFERRED EMBODIMENTS

Figure 1:
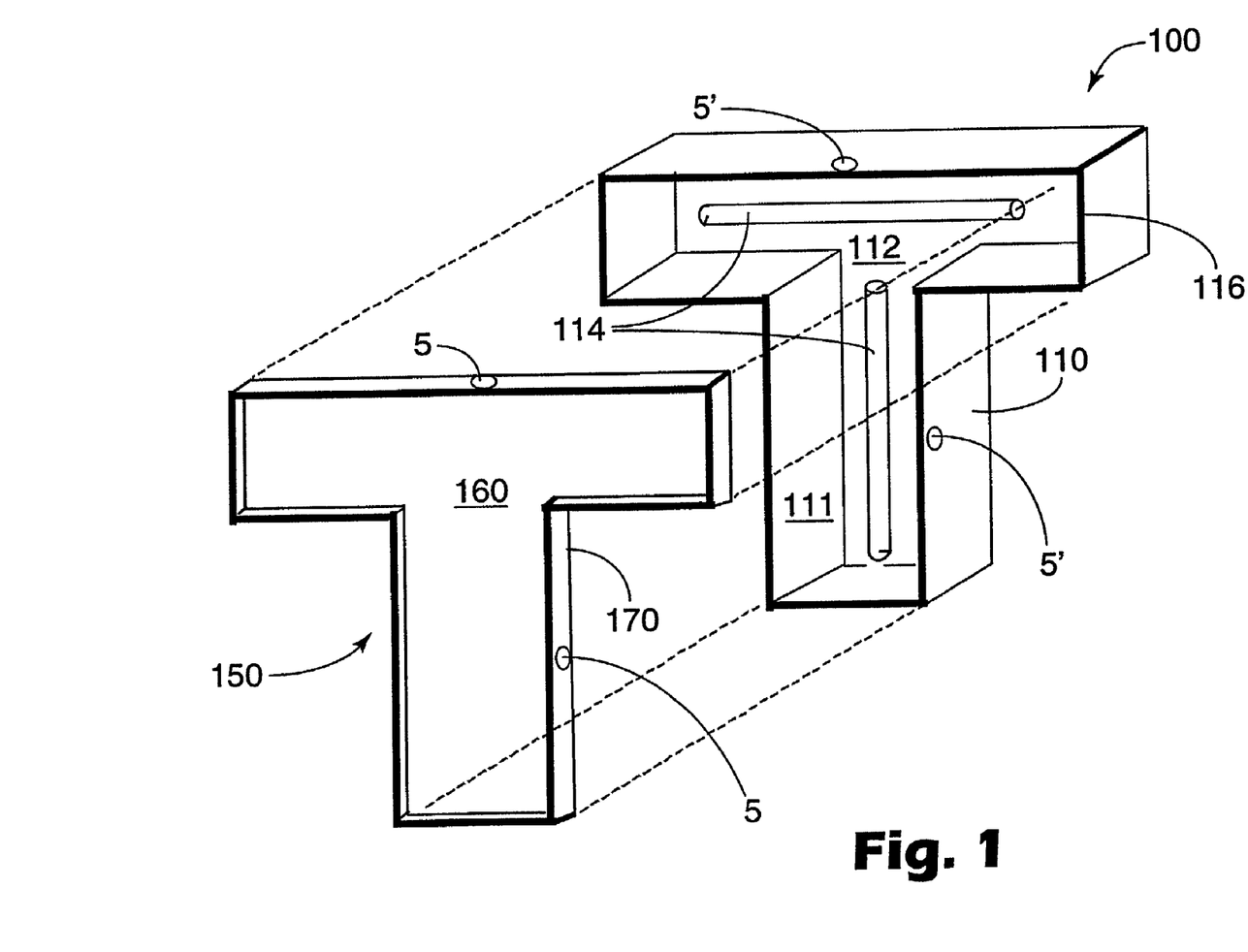
FIG. 1 is a perspective exploded view showing an example of a sign cabinet in the form of a channel letter having a trim cap according to the present invention.

Referring to FIG. 1, a channel letter in the shape of the letter "T" is portrayed. Sign cover 150, shown removed from cabinet 100, is made up of sign face 160 and trim cap 170, which is fixedly attached thereto. When cover 150 is installed on cabinet 100, sign face 160 fits against front edge 116 of cabinet 100, with trim cap 170 engaging the front peripheral edge portion of cabinet 100. Cover 150 is removably held in place on cabinet 100 by self-tapping screws or other suitable fasteners (not shown) installed in mating holes 5 and 5' drilled through trim cap 170 and riser 110. It is preferred that these fasteners be removable in order to provide access to cabinet 100 for maintenance.

Cabinet 100 is made up of back panel 112 and side panels or risers 110. Back illumination for sign face 160 is provided by light sources 114, which may be, for example, fluorescent light tubes. It is preferred that inside surface 111 of riser 110, as well as back panel 112, be diffusely reflective, so as to improve light utilization and uniformity of illumination of face 160.

Cover 150 is fabricated by first creating face 160 in the shape of the channel letter being fabricated. As one option, the face 160 is cut from a sheet of transparent or translucent polymeric material such as polycarbonate or polymethyl methacrylate. An example of a suitable thickness for face 160 is 4.8 millimeters (3/16 inch). Optionally, the sheet of polymeric material may be colorless. Color may then be added to the sign face by laminating a layer of a tinted translucent film to the colorless sheet material. An example of a suitable tinted film is plasticized polyvinyl chloride film, such as 3M™ Scotchcal™ translucent graphic film, such as Series 3630 from 3M Company. As another option, the face may comprise a single sheet of colored transparent or translucent polymeric material such as colored polycarbonate. Cutting of the sign face sheet to the desired shape can be done by laying out the desired pattern on a sheet of material and cutting with a saw or router. Alternative methods, including automated cutting machines, are also available. Preferably, cutting of the sign face sheet is carried out such that the resultant cut edge is relatively smooth. Preferably, the cut edge is cleaned of any debris. A cleaning agent such as isopropanol or other acceptable solvent may be used to ensure that the edge is clean and free of debris.

Bending of trim cap stock to form trim caps can be performed using an automatic trim cap forming machine of the type disclosed in published PCT Application WO 01/21336. This machine determines the location, radius, and angle of the bends needed, based upon dimensional data relating to the shape of the face. This machine then performs the required bending at certain points on a length of trim cap material fed from a stock roll. Alternatively, trim caps can be hand formed by hand fitting the trim cap stock material to the edge of the sign face while bending it, using, for example, pliers or other appropriate bending tools, to achieve the desired shape for the trim cap. When sharp bends are to be made, it may be necessary to notch out a small amount of material in the interior of the bend in order to allow a sufficiently sharp bend to be formed.

It has been found that achieving an exact fit of the formed trim cap material for any but the simplest channel letter shapes is frequently impractical, due to springback of the trim cap material during bending, material property variations in the trim cap stock material, and other imperfections in the bending process. For this reason, when adhesives are used, it is common practice to hold the formed trim cap in contact with the edge of the sign face until sufficient adhesion occurs to hold the trim cap in its installed position. If the method used to adhere the trim cap to the edge of the sign face involves an adhesive that requires significant time to achieve an adequate level of adhesion, some form of fixturing is typically provided to secure the trim cap to the sign face while curing or other setting of the adhesive takes place. Commonly used methods of fixturing include magnets resting on a steel table and nails driven into a wooden table (as described above) in such a manner as to hold the trim cap against the sign face. Unfortunately, such methods used in the past significantly restricted the production rate in the shop, since the fixturing is held against the trim cap until an adequate level of adhesion or cure is achieved. It would be possible to increase the production rate by providing additional fixtures and indoor space to hold such fixtures, but such practice leads to an increase in costs. In the present invention, this fixturing step can be substantially reduced or eliminated by the use of conformable pressure activated adhesive. The conformable pressure activated adhesive used in the present invention achieves adequate adhesion quickly and as a result the production rate of channel letters can be increased.

Figure 2:
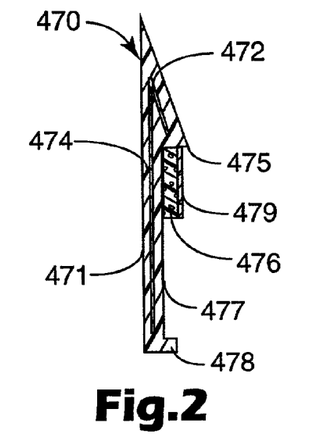
FIG. 2 is an enlarged side cross-sectional view of the trim cap shown in FIG. 1 except that a release liner is still attached.

Referring to FIG. 2, a cross section of a preferred trim cap stock material 470 for making the trim cap 170 is portrayed. Folded sheet metal band 472 (such as aluminum) is encased in a polymeric material 474 (such as polyvinyl butyral) to form a trim cap band structure having a lip portion 475 which runs longitudinally along the length of the trim cap stock material. Trim cap stock material 470 may optionally further include a second lip or bead 478, which extends along a lower longitudinal edge of stock material 470. Optionally, the lip portion 475 and the bead 478 are integrally molded with the remaining portions of the polymeric material 474. Conformable pressure activated adhesive strip 476 extends longitudinally adjacent to lip portion 475, preferably for the length of the trim cap stock material. It is preferred that removable liner 479 be provided for protecting adhesive material 476 from contamination and from unwanted adhesion to other surfaces prior to application.

Figure 3:
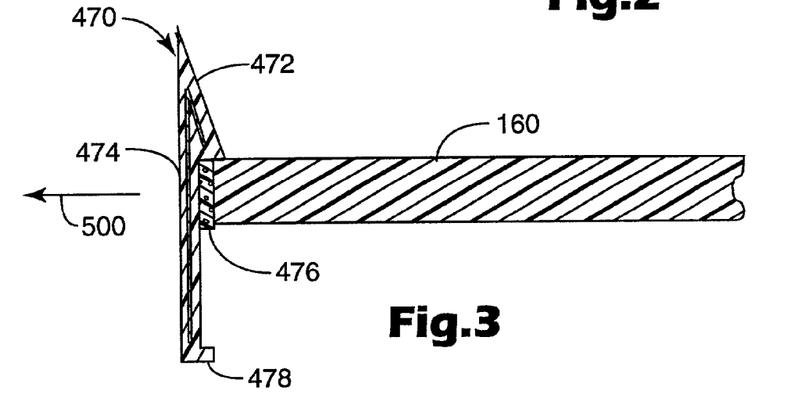
FIG. 3 is a view somewhat similar to FIG. 2, except that FIG. 3 also includes a portion of a sign face of the channel letter.

In a preferred embodiment, after trim cap material 470 has been formed by bending it into the shape of the edge of sign face 160, liner 479 is removed, and the trim cap material is applied to the edge of face 160 by pressing adhesive 476 against the edge of face 160 so as to urge it into intimate contact as portrayed in FIG. 3. In order to compensate for dimensional tolerances in the sign face and in the formed trim cap, the cut length of trim cap material is slightly longer than that needed for a particular sign face, so that as the process of applying the trim cap to the face is completed, a slight excess of trim cap material will be present. This excess trim cap material can then be trimmed to the exact size needed without the risk of leaving a gap in the trim cap. As a final step in applying the trim cap to the sign face, an overlapping tab of material may be adhered in an inconspicuous location across the seam created by the ends adjoining ends of the trim cap, so as to improve the durability of the sign cover.

Figure 4:
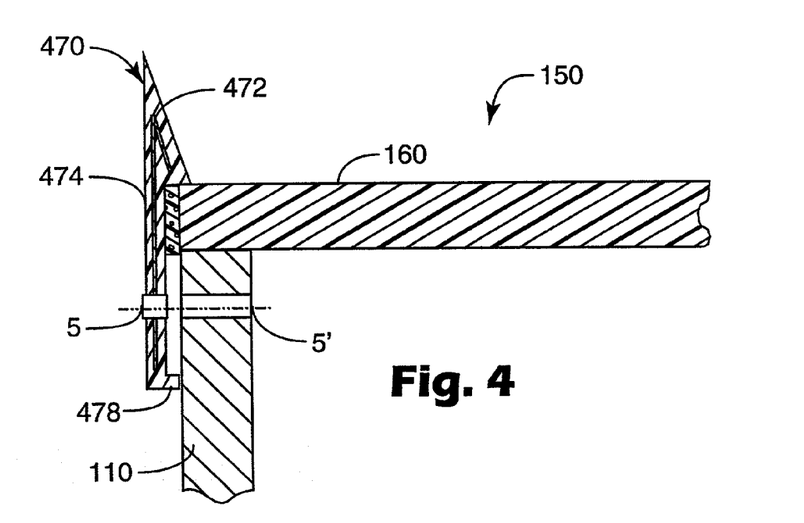
FIG. 4 is a view somewhat similar to FIG. 3, except that the trim cap and the sign face have been connected to a riser of the sign cabinet.

Referring to FIG. 4, after adhesion of trim cap 470 to sign face 160 has been completed, the resulting sign cover is fitted over cabinet riser 110. Holes 5–5' can then be drilled at various appropriate locations to receive self-tapping screws or other suitable fasteners. It is preferred that any such fasteners be removable so as to allow removal of cover 150 for changing of fluorescent tubes or other maintenance tasks.

It is preferred that adhesive layer 476 be of sufficient thickness and conformability to accommodate any irregularities and imperfections in the edge of face 160, while also allowing intimate adhesive contact between the adhesive surface of layer 476 and the edge of face 160. Suitable thicknesses of the adhesive layer 476 include thicknesses in the range of about 0.015 in (0.38 mm) to about 0.062 in (1.6 mm). For example, the adhesive layer 476 may be 0.045 in (1.1 mm) thick. At the same time, referring to FIG. 3, it is preferred that adhesive layer 476 be able to withstand significant tensile loading in direction 500, which is the direction of loading produced by springback and other imperfections in the bend formation of the trim cap. Since adhesive layer 476 is relatively narrow, its cross sectional area is relatively small, and as a result the tensile stresses due to tensile loading in direction 500 can be high. Some otherwise satisfactory foam adhesive materials have been found to creep and to otherwise fail under tensile loading when used in this application.

In a preferred embodiment, adhesive layer 476 is a three-layer composite that comprises a layer of polymeric foam having a layer of tacky pressure sensitive adhesive that extends along at least a portion of each major surface, and preferably across the entirety of each major surface (i.e., the surface facing the edge 160 and the surface opposite such surface). The foam is preferably formed by incorporating hollow expanded polymeric microspheres into a crosslinked polymeric matrix. Although the exact theory of performance is not known with certainty, it is believed that the mechanical deformation characteristics of substantially spherical polymeric microspheres contribute significantly to the ability of foams comprising such microspheres to provide the combination of conformability under compressive loading and strain and resistance in tensile loading that is needed for reliably holding trim caps to sign faces. Examples of suitable foams containing the expanded polymeric microspheres for the adhesive layer 476 are described in U.S. Pat. No. 6,103,152 which is incorporated by reference herein.

An example of a preferred material for the polymer foam is an acrylic polymer or copolymer. Optionally, the foam may be crosslinked. The foam preferably is substantially free of urethane crosslinks and urea crosslinks, thus eliminating the need for isocyanates in the composition.

One method of crosslinking the foam is to expose the foam to radiation from an electron beam source for improved cohesive strength. Other sources of radiation such as ion beam gamma radiation and ultraviolet radiation may be used so long as the radiation is energetic enough to penetrate the thickness of the foam to initiate and complete the crosslinking reaction. Optionally, the foam is exposed to radiation along both of its major surfaces for adequate crosslinking. Following exposure to radiation, the resulting foam may be rolled up onto a take-up roll (optionally in a criss-cross arrangement on the roll) and optionally exposed to additional radiation.

The polymer foam preferably includes a plurality of expandable polymeric microspheres. The foam may also include one or more non-expandable microspheres, which may be polymeric or non-polymeric microspheres (e.g., glass microspheres).

Examples of preferred expandable polymeric microspheres include those in which the shell is essentially free of vinylidene chloride units. Preferred core materials are materials other than air that expand upon heating.

The foam may contain agents in addition to hollow microspheres. Examples of suitable agents include tackifiers (e.g., rosin esters, terpenes, phenols, and aliphatic, aromatic, or mixtures of aliphatic and aromatic synthetic hydrocarbon resins), plasticizers, pigments, dyes, non-expandable polymeric or glass microspheres, reinforcing agents, hydrophobic or hydrophilic silica, calcium carbonate, toughening agents, fire retardants, antioxidants, finely ground polymeric particles such as polyester, nylon, or polypropylene, stabilizers, and combinations thereof. Chemical blowing agents may be added as well. The agents are added in amounts sufficient to obtain the desired end properties.

The foam may also include gas-filled voids in the polymer matrix. Such voids typically are formed by including a blowing agent in the polymer matrix material and then activating the blowing agent, e.g., by exposing the polymer matrix material to heat or radiation.

Optionally, the foam matrix includes a blend of two or more polymers in which at least one of the polymers in the blend is a pressure sensitive adhesive polymer (i.e., a polymer that is inherently pressure sensitive, as opposed to a polymer which must be combined with a tackifier in order to form a pressure sensitive composition) and at least one of the polymers is selected from the group consisting of unsaturated thermoplastic elastomers, acrylate-insoluble saturated thermoplastic elastomers, and non-pressure sensitive adhesive thermoplastic polymers.

As indicated above, the foam preferably includes a polymer matrix and one or more expandable polymer microspheres. Examination of the foam by electron microscopy reveals that the foam microstructure is characterized by a plurality of enlarged polymeric microspheres (relative to their original size) distributed throughout the polymer matrix. At least one of the microspheres (and preferably more) is still expandable, i.e., upon application of heat it will expand further without breaking. This can be demonstrated by exposing the foam to a heat treatment and comparing the size of the microspheres obtained by electron microscopy to their pre-heat treated size (also obtained by electron microscopy).

As used herein, a "polymer foam" refers to an article that includes a polymer matrix in which the density of the article is less than the density of the polymer matrix alone.

An "expandable polymeric microsphere" is a microsphere that includes a polymer shell and a core material in the form of a gas, liquid, or combination thereof, that expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature.

The foam is further characterized by a surface that is substantially smooth. As used herein, a "substantially smooth" surface refers to a surface having an Ra value less than about 75 micrometers, as measured by laser triangulation profilometry according to the procedure described in the Examples of U.S. Pat. No. 6,103,152. Preferably, the surface has an Ra value less than about 50 micrometers, more preferably less than about 25 micrometers. The surface is also characterized by the substantial absence of visually observable macroscopic defects such as wrinkles, corrugations and creases. In addition, in the case of an adhesive surface, the surface is sufficiently smooth such that it exhibits adequate contact and, thereby, adhesion to a substrate of interest. The desired threshold level of adhesion will depend on the particular application for which the article is being used.

Substantially smooth-surfaced foams are desirable for a number of reasons. For example, when the foam is laminated to the edge of a sign face, the substantially smooth surface minimizes air entrapment between the foam and the edge. Moreover, in the case of adhesive foams, the substantially smooth surface maximizes contact with the edge to which the foam is applied, leading to good adhesion. Optionally, a foam with an embossed pattern may be employed to facilitate the escape of air such as described in U.S. Pat. No. 6,197,397, which is incorporated by reference herein.

A variety of different polymer resins, as well as blends thereof, may be used for the polymer matrix as long as the resins are suitable for melt extrusion processing. For example, it may be desirable to blend two or more acrylate polymers having different compositions. A wide range of foam physical properties can be obtained by manipulation of the blend component type and concentration. Preferably, the foam is soft and conformable.

One class of useful polymers includes acrylate and methacrylate adhesive polymers and copolymers. Such polymers can be formed by polymerizing one or more monomeric acrylic or methacrylic esters of non-tertiary alkyl alcohols, with the alkyl groups having from 1 to 20 carbon atoms (e.g., from 3 to 18 carbon atoms). Suitable acrylate monomers include methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates, e.g., benzyl acrylate and cyclobenzyl acrylate.

Optionally, one or more monoethylenically unsaturated co-monomers may be polymerized with the acrylate or methacrylate monomers; the particular amount of co-monomer is selected based upon the desired properties of the polymer. One group of useful co-monomers includes those having a homopolymer glass transition temperature greater than the glass transition temperature of the acrylate homopolymer. Examples of suitable co-monomers falling within this group include acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth)acrylate, N,N-diethylacrylamide, beta-carboxyethyl acrylate, vinyl esters of neodecanoic, neononanoic, neopentanoic, 2-ethylhexanoic, or propionic acids (e.g., available from Union Carbide Corp. of Danbury, Conn. under the designation "Vynates"), vinylidene chloride, styrene, vinyl toluene, and alkyl vinyl ethers.

A second group of monoethylenically unsaturated co-monomers which may be polymerized with the acrylate or methacrylate monomers includes those having a homopolymer glass transition temperature less than the glass transition temperature of the acrylate homopolymer. Examples of suitable co-monomers falling within this class include ethyloxyethoxy ethyl acrylate (Tg=−71° C.) and a methoxypolyethylene glycol 400 acrylate (Tg=−65° C.; available from Shin Nakamura Chemical Co., Ltd. under the designation "NK Ester AM-90G").

A second class of polymers useful for the polymer matrix of the foam includes acrylate-insoluble polymers. Examples include semicrystalline polymer resins such as polyolefins and polyolefin copolymers (e.g., based upon monomers having between 2 and 8 carbon atoms such as low density polyethylene, high density polyethylene, polypropylene, ethylene-propylene copolymers, etc.), polyesters and co-polyesters, polyamides and copolyamides, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with base), and cellulose acetate. Other examples of acrylate-insoluble polymers include amorphous polymers having a solubility parameter (as measured according to the Fedors' technique) less than 8 or greater than 11 such as polyacrylonitrile, polyvinyl chloride, thermoplastic polyurethanes, aromatic epoxies, polycarbonate, amorphous polyesters, amorphous polyamides, ABS copolymers, polyphenylene oxide alloys, ionomers (e.g., ethylene-methacrylic acid copolymers neutralized with salt), fluorinated elastomers, and polydimethyl siloxane.

A third class of polymers useful for the polymer matrix of the foam includes elastomers containing ultraviolet radiation-activatable groups. Examples include polybutadiene, polyisoprene, polychloroprene, random and block copolymers of styrene and dienes (e.g., SBR), and ethylene-propylene-diene monomer rubber.

A fourth class of polymers useful for the polymer matrix of the foam includes pressure sensitive and hot melt adhesives prepared from non-photopolymerizable monomers. Such polymers can be adhesive polymers (i.e., polymers that are inherently adhesive), or polymers that are not inherently adhesive, but are capable of forming adhesive compositions when compounded with tackifiers. Specific examples include poly-alpha-olefins (e.g., polyoctene, polyhexene, and atactic polypropylene), block copolymer-based adhesives, natural and synthetic rubbers, silicone adhesives, ethylene-vinyl acetate, and epoxy-containing structural adhesive blends (e.g., epoxy-acrylate and epoxy-polyester blends).

The polymer composition preferably has a viscosity, measured at a temperature of 175° C. and a shear rate of 100 sec$^{-1}$, of at least 30 Pascal-seconds (Pa-s), more preferably at least 100 Pa-s and even more preferably at least 200 Pa-s.

The expandable microspheres feature a flexible, thermoplastic, polymeric shell and a core that includes a liquid and/or gas which expands upon heating. Preferably, the core material is an organic substance that has a lower boiling point than the softening temperature of the polymeric shell. Examples of suitable core materials include propane, butane, pentane, isobutane, neopentane, and combinations thereof.

The use of microspheres is highly advantageous in that the microspheres are soft and conformable, and yet provide resistance to elongation of the foam in a tensile direction (i.e., in a "z" direction). The use of a foam containing microspheres is an advantage over foams with voids but no microspheres, because the voids do not limit expansion of the foam material. By contrast, polymeric spheres may elongate when the foam is subjected to tensile forces, but the elongation is significantly restricted. This resistance to elongated is especially important in z directions, or directions perpendicular away from the narrow edge of the sign face 160 and the polymeric material 474 located next to the opposite side of the adhesive layer 474. The use of foams with polymeric microspheres is also an advantage over foams containing glass microspheres, inasmuch as the glass microspheres cannot be compressed or elongated to any significant extent and consequently do not conform as well to a cut edge surface.

Both thin and thick foams can be used. In addition, both adhesive and non-adhesive foams can be used. In the latter case, the foam may be combined with one or more separate adhesive compositions to form an adhesive article. In addition, it is possible to prepare foams from a number of different polymer matrices, including polymer matrices that are incompatible with foam preparation processes that rely on actinic radiation-induced polymerization of microsphere-containing photopolymerizable compositions. Examples of such polymer matrix compositions include unsaturated thermoplastic elastomers and acrylate-insoluble saturated thermoplastic elastomers. Similarly, it is possible to include additives such as ultraviolet-absorbing pigments (e.g., black pigments), dyes, and tackifiers. It is further possible, in contrast to solvent-based and actinic radiation-based foam processes, to prepare foams having a substantially homogeneous distribution of microspheres. In addition, the present expanded foam (i.e., a foam containing microspheres that have been at least partially expanded) can have a uniform size distribution of the expanded microspheres from the surface to the center of the foam. That is, there is no gradient of expanded microsphere sizes from the surface to the center of the foam, e.g., like that found in expanded foams which are made in a press or a mold. Expanded foams that exhibit such a size distribution gradient of their expanded microspheres can exhibit weaker mechanical properties than such foams that have a uniform size distribution of the expanded microspheres.

The choice of thermoplastic resin for the polymeric shell influences the mechanical properties of the foam. Accordingly, the properties of the foam may be adjusted through appropriate choice of microsphere, or by using mixtures of different types of microspheres. For example, acrylonitrile-containing resins are useful where high tensile and cohesive strength are desired, particularly where the acrylonitrile content is at least 50% by weight of the resin, more preferably at least 60% by weight, and even more preferably at least 70% by weight. In general, both tensile and cohesive strength increase with increasing acrylonitrile content. In some cases, it is possible to prepare foams having higher tensile and cohesive strength than the polymer matrix alone, even though the foam has a lower density than the matrix. This provides the capability of preparing high strength, low density adhesive layers.

Examples of suitable thermoplastic resins which may be used as the shell include acrylic and methacrylic acid esters such as polyacrylate; acrylate-acrylonitrile copolymer; and methacrylate-acrylic acid copolymer. Vinylidene chloride-containing polymers such as vinylidene chloride-methacrylate copolymer, vinylidene chloride-acrylonitrile copolymer, acrylonitrile-vinylidene chloride-methacrylonitrile-methyl acrylate copolymer, and acrylonitrile-vinylidene chloride-methacrylonitrile-methyl methacrylate copolymer may also be used, but are not preferred where high strength is desired. In general, the microsphere shell preferably has no more than 20% by weight vinylidene chloride, more preferably no more than 15% by weight vinylidene chloride. Optionally, microspheres have essentially no vinylidene.

Examples of suitable commercially available expandable polymeric microspheres include those available from Pierce Stevens (Buffalo, N.Y.) under the designations "F30D," "F80SD," and "F100D." Also suitable are expandable polymeric microspheres available from Akzo-Nobel under the designations "Expancel 551," "Expancel 461," and "Expancel 091." Each of these microspheres features an acrylonitrile-containing shell. In addition, the F80SD, F100D, and Expancel 091 microspheres have essentially no vinylidene chloride units in the shell.

The amount of expandable microspheres is selected based upon the desired properties of the foam product. In general, the higher the microsphere concentration, the lower the density of the foam. In general, the amount of microspheres ranges from about 0.1 parts by weight to about 50 parts by weight (based upon 100 parts of polymer resin), more preferably from about 0.5 parts by weight to about 20 parts by weight. An example of a suitable size of the microspheres is about 0.1 mm (0.004 in) in diameter when expanded.

Suitable adhesives for the adhesive layer 476 include any adhesive that provides acceptable adhesion to a variety of polar and non-polar substrates. Pressure sensitive adhesives are generally acceptable. Suitable pressure sensitive adhesives include those based on acrylic polymers, polyurethanes, thermoplastic elastomers such as those commercially available under the trade designation KRATON (e.g., styrene-isoprene-styrene-butadiene-styrene and combinations thereof) and other block copolymers, polyolefins such as poly-alpha-olefins and amorphous polyolefins, silicones, rubber based adhesives (including natural rubber, polyisoprene, polyisobutylene, butyl rubber etc.) as well as combinations or blends of these adhesives. The adhesive component may contain tackifiers, plasticizers, rheology modifiers, fillers, fibers, crosslinkers, antioxidants, dyes, colorants, conductive particulates, adhesion promoters (e.g., silanes), antistatic agents, as well as active components such as an antimicrobial agent.

Pressure sensitive adhesives known to be useful in the present invention are, for example, the acrylate copolymers described in U.S. Pat. No. RE 24,906 (incorporated by reference herein), and particularly a copolymer comprising a weight ratio of from about 90:10 to about 98:2 iso-octyl acrylate: acrylic acid copolymer. Also acceptable is a copolymer comprising a weight ratio of about 90:10 to about 98:2 2-ethylhexyl acrylate: acrylic acid copolymer, and a 65:35 2-ethylhexyl acrylate:isobornyl acrylate copolymer. Useful adhesives are described in U.S. Pat. Nos. 5,804,610 and 5,932,298, both of which are incorporated herein by reference. The inclusion of antimicrobial agents in the adhesive is also contemplated, such as is described in U.S. Pat. Nos. 4,310,509 and 4,323,557 both of which are incorporated herein by reference. Blends of acrylic adhesives and rubber based adhesives may also be used such as is described in PCT International Publication Number WO 01/57152 which is incorporated herein by reference.

The adhesive layer 476 has an initial maximum Shore A hardness that is preferably less than about 55, more preferably less than about 45 and even more preferably less than about 35. The Shore A hardness is determined by placing a section of the adhesive layer 476 onto a hard backing (such as glass) at room temperature and then using a Shore A Hardness Tester. A suitable Shore A Hardness Tester is model CB Stand Durometer Type A ASTM D2240 gauge available from Shore Instrument Manufacturing Company of Freeport, N.Y. The initial hardness of the adhesive layer 476 is measured a number of times and the maximum hardness values obtained are then averaged.

The adhesive layer 476 also demonstrates substantial adhesion to substrates according to the 90 Degree Peel Adhesion test, following Pressure Sensitive Tape Council test method PSTC-5 "Quick Stick of Pressure Sensitive Tapes" at a crosshead speed of 30 cm/min (12 in/min) using an Instron tensile tester at room temperature. To determine the peel adhesion, the peel value obtained from a first section of peel (such as a section of about 2.54 cm or 1 in) is ignored, and a peel value of a next section (such as a section having a length of about 8.9 cm or 3.5 in) is then recorded. The substrate is stainless steel, polycarbonate or polymethylmethacrylate. The 90 Degree Peel Adhesion Value according to that procedure is preferably greater than about 1.8 kg per cm of width (about 10 lb per inch of width), more preferably greater than about 2.7 kg per cm of width (about 15 lb per inch of width) and most preferably greater than about 3.6 kg per cm of width (about 20 lb per inch of width).

The adhesive layer 476 also exhibits significant strength according to the Foam Split Strength test. Foam Split Strength is determined using the procedure set out above for the 90 Degree Peel Adhesion Test, except that the substrate is anodized aluminum. The Foam Split Strength is preferably greater than about 2.7 kg per cm of width (about 15 lb per inch of width), more preferably greater than about 3.6 kg per cm of width (about 20 lb per inch of width) and most preferably greater than about 4.5 kg per cm of width (about 25 lb per inch of width).

The adhesive layer 476 also demonstrates significant strength in tension. Preferably, the tensile strength is the dynamic tensile strength test according to ASTM D-897, conducted at room temperature, with a crosshead speed of 5.1 cm per min (2 inches per min). The tensile strength of the adhesive layer 476 is preferably greater than about 450 kPa (65 lb/in$^2$), more preferably greater than about 515 kPa (75 lb/in$^2$), even more preferably greater than about 585 kPa (85 lb/in$^2$) and most preferably greater than about 690 kPa (100 lb/in$^2$).

The trim cap of the present invention performs well in exterior applications where it may be exposed to a wide range of temperature extremes. The viscoelasticity of the adhesive layer 476 enables various components of the channel letter (such as the cabinet 100 and the sign face 160) to expand and contract without fracturing the adhesive bond between the adhesive layer and the edge of face 160. For example, in certain outdoor applications, the temperatures may be as low as −40° C. (−40° F.) and as high as 65° C. (150° F.). The resultant expansion and contraction may exert a significant tensile force on the adhesive bond between the trim cap 470 and the edge of the sign face 160, but in general the trim cap 470 of the present invention remains attached in those circumstances.

Additionally, the adhesive layer 476 may be subjected to significant tensile forces when an attempt is made to place the sign face 160 over the cabinet 110. During the assembly procedure, the trim cap 470 may need to be bent outwardly due to slight dimensional errors in construction of the cabinet 110 or the sign face 160. The adhesive layer 476 has sufficient viscoelasticity to enable the trim cap 170 to be bent outwardly in such a instance as may be needed to accommodate the placement of the trim cap 170 around the exterior peripheral edge of the cabinet 110. Such bending may not be possible with prior art constructions having a rigid bond connecting the trim cap to the sign face.

Another advantage of the present invention is that the adhesive layer 476 bonds well to sign faces made of polycarbonate. In the past, manufacturers often avoided the use of polycarbonate for sign faces because the adhesive used to bond the trim cap to the polycarbonate sign face required a relatively long curing time (such as 24 hours). As a result, manufacturers often turned to other materials, such as sign faces made of acrylic. Unfortunately, acrylic has poor impact resistance and in many jurisdictions the electrical components within the channel letter must be shielded to a greater extent than would be otherwise necessary when using polycarbonate materials. The additional shielding represents an expense that is avoided by use of the present invention when the present invention is used for sign faces made of polycarbonate.

I claim:

1. A stock material for forming trim caps, comprising:
   an elongated formable band having a major surface, wherein the band comprises a metal layer and a polymeric material extending over the metal layer, and
   a pressure activated adhesive layer connected to the major surface of the band, the adhesive layer extending along the longitudinal axis of the band, wherein the adhesive layer is conformable in directions toward the major surface, and wherein the band further comprises a lip adjacent the adhesive layer, wherein the adhesive later comprises a foam layer and at least one pressure activated adhesive layer attached to the foam layer, and wherein the at least one pressure activated adhesive layer comprises two adhesive layers that are attached to opposite sides of the foam layer.

2. The stock material according to claim 1 wherein the at least one pressure activated adhesive layer extends over substantially all of a major surface of the foam layer.

3. A stock material for forming trim caps, comprising:
   an elongated formable band having a major surface, wherein the band comprises a metal layer and a polymeric material extending over the metal layer, and
   a pressure activated adhesive layer connected to the major surface of the band, the adhesive layer extending along the longitudinal axis of the band, wherein the adhesive layer is conformable in directions toward the major surface, and wherein the band further comprises a lip adjacent the adhesive layer, wherein the adhesive later comprises a foam layer and at least one pressure activated adhesive layer attached to the foam layer, and wherein the foam layer comprises polymeric microspheres.

4. A stock material for forming trim caps, comprising:
   an elongated formable band having a major surface, wherein the band comprises a metal layer and a polymeric material extending over the metal layer, and
   a pressure activated adhesive layer connected to the major surface of the band, the adhesive layer extending along the longitudinal axis of the band, wherein the adhesive layer is conformable in directions toward the major surface, and wherein the band further comprises a lip adjacent the adhesive layer, wherein the adhesive later comprises a foam layer and at least one pressure activated adhesive layer attached to the foam layer, and wherein the foam layer comprises flexible microspheres.

5. A stock material for forming trim caps, comprising:
   an elongated formable band having a major surface, wherein the band comprises a metal layer and a polymeric material extending over the metal layer, and
   a pressure activated adhesive layer connected to the major surface of the band, the adhesive layer extending along the longitudinal axis of the band, wherein the adhesive layer is conformable in directions toward the major surface, and wherein the band further comprises a lip adjacent the adhesive layer, wherein the width of the adhesive layer is less than the width of the band.

6. A stock material for forming trim caps, comprising:
an elongated formable band having a major surface, wherein the band comprises a metal layer and a polymeric material extending over the metal layer, and
a pressure activated adhesive layer connected to the major surface of the band, the adhesive layer extending along the longitudinal axis of the band, wherein the adhesive layer is conformable in directions toward the major surface, and wherein the band further comprises a lip adjacent the adhesive layer, wherein the adhesive layer has an adhesion of greater than about 1.7 kg per cm of width when determined according to the 90 Degree Peel Adhesion Test.

7. A stock material for forming trim caps, comprising:
an elongated formable band having a major surface, wherein the band comprises a metal layer and a polymeric material extending over the metal layer, and
a pressure activated adhesive layer connected to the major surface of the band, the adhesive layer extending along the longitudinal axis of the band, wherein the adhesive layer is conformable in directions toward the major surface, and wherein the band further comprises a lip adjacent the adhesive layer, wherein the adhesive layer has a tensile strength of greater than about 450 kPa when determined according to ASTM D-897 with a jaw speed of 5.1 cm per min.

8. A stock material for forming trim caps, comprising:
an elongated formable band having a major surface, wherein the band comprises a metal layer and a polymeric material extending over the metal layer, and
a pressure activated adhesive layer connected to the major surface of the band, the adhesive layer extending along the longitudinal axis of the band, wherein the adhesive layer is conformable in directions toward the major surface, and wherein the band further comprises a lip adjacent the adhesive layer, wherein the adhesive layer has a shore A hardness of less than about 55.

9. A channel letter having a sign face with a peripheral edge and a trim cap connected to the peripheral edge, wherein the trim cap includes a conformable pressure activated adhesive layer in contact with the peripheral edge, the adhesive layer comprising a pressure activated adhesive and a foam layer, wherein the foam layer comprises polymeric microspheres.

10. A channel letter according to claim 9 wherein the trim cap comprises an elongated band having a lip adjacent the adhesive layer.

11. A channel letter according to claim 9 wherein the trim cap comprises an elongated band that includes a metal layer and a polymeric material extending over the metal layer.

12. A channel letter according to claim 9 wherein the trim cap comprises an elongated band having a certain width, and wherein the width of the adhesive layer is less than the width of the band.

13. A channel letter according to claim 9 wherein the adhesive layer has an adhesion of greater than about 1.7 kg per cm width when determined according to the 90 Degree Peel Adhesion Test.

14. The channel letter according to claim 9 wherein the adhesive layer has a tensile strength of greater than about 450 kPa when determined according to ASTM D-897 with a jaw speed of 5.1 cm per min.

15. The channel letter according to claim 9 wherein the adhesive layer has a shore A hardness of less than about 55.

16. A channel letter having a sign face with a peripheral edge and a trim cap connected to the peripheral edge, wherein the trim cap includes a conformable pressure activated adhesive layer in contact with the peripheral edge, the adhesive layer comprising a pressure activated adhesive and a foam layer.

17. A channel letter according to claim 16 wherein the trim cap comprises an elongated band having a lip adjacent the adhesive layer.

18. A channel letter according to claim 16 wherein the trim cap comprises an elongated band that includes a metal layer and a polymeric material extending over the metal layer.

19. A channel letter according to claim 16 wherein the trim cap comprises an elongated band having a certain width, and wherein the width of the adhesive layer is less than the width of the band.

20. A channel letter according to claim 16 wherein the adhesive layer has an adhesion of greater than about 1.7 kg per cm width when determined according to the 90 Degree Peel Adhesion Test.

21. The channel letter according to claim 16 wherein the adhesive layer has a tensile strength of greater than about 450 kPa when determined according to ASTM D-897 with a jaw speed of 5.1 cm per min.

22. The channel letter according to claim 16 wherein the adhesive layer has a shore A hardness of less than about 55.

* * * * *

UNITED STATES PATENT AND TRADEMARK OFFICE
CERTIFICATE OF CORRECTION

PATENT NO. : 7,181,875 B2
APPLICATION NO. : 10/112995
DATED : February 27, 2007
INVENTOR(S) : Rodney R. Lewis It is certified that error appears in the above-identified patent and that said Letters Patent is hereby corrected as shown below:

Column 12
Line 19, In Claim 1, delete "later" and insert -- layer --, therefor.
Line 37, In Claim 3, delete "later" and insert -- layer --, therefor.
Line 52, In Claim 4, delete "later" and insert -- layer --, therefor.

Column 13
Line 25, In Claim 7, delete "ajaw" and insert -- a jaw --, therefor.

Column 14
Line 43, In Claim 21, delete "ajaw" and insert -- a jaw --, therefor.

Signed and Sealed this

Fifteenth Day of May, 2007

JON W. DUDAS
*Director of the United States Patent and Trademark Office*